(12) United States Patent
Lee et al.

(10) Patent No.: US 9,273,893 B2
(45) Date of Patent: Mar. 1, 2016

(54) MANUFACTURING EQUIPMENT FOR RAPIDLY FREEZING SPHERICALLY-SHAPED FOODS USING A CRYOGENIC REFRIGERANT

(71) Applicants: Sang Seok Lee, Incheon (KR); Nankyoung Kye, Seoul (KR)

(72) Inventors: Sang Seok Lee, Incheon (KR); Nankyoung Kye, Seoul (KR)

( * ) Notice: Subject to any disclaimer, the term of this patent is extended or adjusted under 35 U.S.C. 154(b) by 268 days.

(21) Appl. No.: 13/903,066

(22) Filed: May 28, 2013

(65) Prior Publication Data
US 2013/0269371 A1    Oct. 17, 2013

(51) Int. Cl.
| | |
|---|---|
| *F25C 1/10* | (2006.01) |
| *F25C 1/12* | (2006.01) |
| *F25C 1/22* | (2006.01) |
| *A23G 9/08* | (2006.01) |
| *A23G 9/22* | (2006.01) |
| *A23G 9/14* | (2006.01) |
| *F25D 3/10* | (2006.01) |
| *A23L 3/36* | (2006.01) |
| *A23G 9/44* | (2006.01) |

(52) U.S. Cl.
CPC .. *F25D 3/10* (2013.01); *A23G 9/22* (2013.01); *A23G 9/44* (2013.01); *A23L 3/36* (2013.01)

(58) Field of Classification Search
CPC .............. F25C 1/10; F25C 1/12; F25C 1/225; F25C 1/22; F25C 5/02; F25C 5/04; F25C 2305/022; F25C 2400/14; A23G 9/083; A23G 9/086; A23G 9/14; A23G 9/221
See application file for complete search history.

(56) References Cited

U.S. PATENT DOCUMENTS

| | | | | |
|---|---|---|---|---|
| 4,674,968 | A * | 6/1987 | Durst | 425/256 |
| 5,419,140 | A * | 5/1995 | Germain | 62/49.2 |
| 2003/0040433 | A1 | 2/2003 | Case | |
| 2004/0099004 | A1* | 5/2004 | Somura | 62/347 |
| 2014/0167321 | A1* | 6/2014 | Culley et al. | 264/319 |

FOREIGN PATENT DOCUMENTS

JP    0608997    * 11/1994

* cited by examiner

*Primary Examiner* — Frantz Jules
*Assistant Examiner* — Erik Mendoza-Wilkenfel
(74) *Attorney, Agent, or Firm* — Michael J. Feigin, Esq.; Feigin & Associates, LLC

(57) ABSTRACT

A method for manufacturing a spherical frozen food is provided. One or more plates are provided. The plates, when together, form a spherical mold. An inlet facilitates the injection of a mixture into the mold. The mold is subjected to a low temperature such that the mixture is caused to freeze. A rotating mechanism may cause one or more of the plates to open and/or rotate outwardly such that the frozen material may be removed from the mold with ease. Liquid nitrogen may be used to freeze the material.

8 Claims, 9 Drawing Sheets

MANUFACTURING EQUIPMENT FOR RAPIDLY FREEZING SPHERICALLY-SHAPED FOODS USING A CRYOGENIC REFRIGERANT

BACKGROUND OF THE DISCLOSED TECHNOLOGY

Typically, packages of ice cream bear a square shape. Upon manufacturing the ice cream, the volume of the ice cream is less than that of the framework.

On the other hand, a conventional technology for making spherical ice exists, one example of such is found in U.S. Patent Publication No. 2003/0040433 to Case. Referring to FIGS. 1 and 2 of Case, the spherical ice is formed by a spherical tray abscess (21). The spherical tray abscess (21) is formed of a semicircular tray upper abscess (21a) and lower abscess (21b).

The semicircular tray upper abscess (21a) and lower abscess (21b) are respectively formed of bottom (32) and upper (33) flanges.

The tray abscesses (21) are formed by the top half (24a) and the bottom half (24b) of the molds. Between the top (24a) and bottom (24b) half of the molds, a rubber packing layer (27) is provided to prevent water leakage.

For injecting water, the top half of the mold (24a) has a vertical injection hole (23), and the bottom half of the mold (24b) has refrigerant piping (25).

However, this spherical ice manufacturing systems need to be installed into the abscess of a separate tray (21) in the mold (24). This makes for a complicated structure and manufacturing process. If it is not installed on the the tray abscess (21), a separate heater is required to be installed for the separation of the ice. Meanwhile, even if it is removed from the mold (24), it is not easy to separate the semicircular upper tray abscess (21a) and the lower tray abscess (21b). In practice, after the ice has frozen, it may be difficult to separate the semicircular upper (21a) and lower (21b) tray absences by the flanges (32,33) due to the frozen nature of the ice. Therefore, the ice must be dipped into hot water to aid in the process of separating.

SUMMARY OF THE DISCLOSED TECHNOLOGY

The presently disclosed invention solves the aforementioned problems. Also, the purpose of the invention is to offer spherical frozen food manufacturing equipment which can be separated to eject the produced frozen food without the need for a heater or separate structure for removing the frozen food products.

In addition, yet another purpose is to offer spherical frozen food manufacturing equipment which can maximize productivity to improve the production rate of frozen foods.

DETAILED DESCRIPTION OF EMBODIMENTS OF THE DISCLOSED TECHNOLOGY

In order to achieve the above objectives, this invention utilizes a spherical frozen food manufacturing apparatus that may spherically freeze materials using a mold and/or one or more molding plates. The molding plate is rapidly frozen from underneath using liquid nitrogen. The molding plate is formed on the inner of fixed plate which is the first molded part used to form a part of frozen foods. The upper, second shaped plate, which is the shape of the frozen foods, forms the interior of the second feature. Using the first and second shaped plates, the interior of the third shaped plate forms a part of the frozen foods. The third shape is formed inside, on the top of the molding plate, having an injected material inlet oriented towards the bottom part. Each of the second and third shape plates are driven by the opening pin, rotating about an axis against the mounting plate. The opening pin is used to expose and extract the frozen food. This is a special feature of the spherical freeze food manufacturing equipment. The second and third shaped plates form an inlet through which the main materials are injected for forming the frozen foods.

The second and third shaped plates form an opening hole that gradually takes on a wider cross section. As the opening pin is inserted into the opening hole, the second and third shaped plates are rotated on the mounting plate.

When the opening pin is deviated from the opening hole in the second and third shaped plates, the rotation may be assisted by a torsion spring.

It may be desirable to insert a feed bar to remove the frozen foods from the inlet. The feed bar may be any long and/or thin rod that may be extended into the unfrozen material such that after the material has frozen, the feed bar is stuck to the frozen materials. Also, the feed bar may be separated from the frozen food to install the heating part in the feed bar.

It may be desirable to have liquid nitrogen stored in the bottom part of the fixed plate. It may also be desirable that the fixed plate achieve temperatures in the range of −60° C. to −80° C., and that the second and third shaped plates achieve temperatures in the range of −40° C.~−60° C.

According to the present invention, spherical frozen food can be prepared as a simple structure that is easily removable from the mold.

In addition, it can be always maintained at a constant temperature, thus not requiring special heating. That's why it can dramatically improve the production rate of the spherical frozen food.

The invention will be described in detail with reference to the accompanying Figures. In the invention, frozen food may be any food or liquid that may be frozen to a certain shape, such as, for example, a round ice-cream bar.

Figure 1:
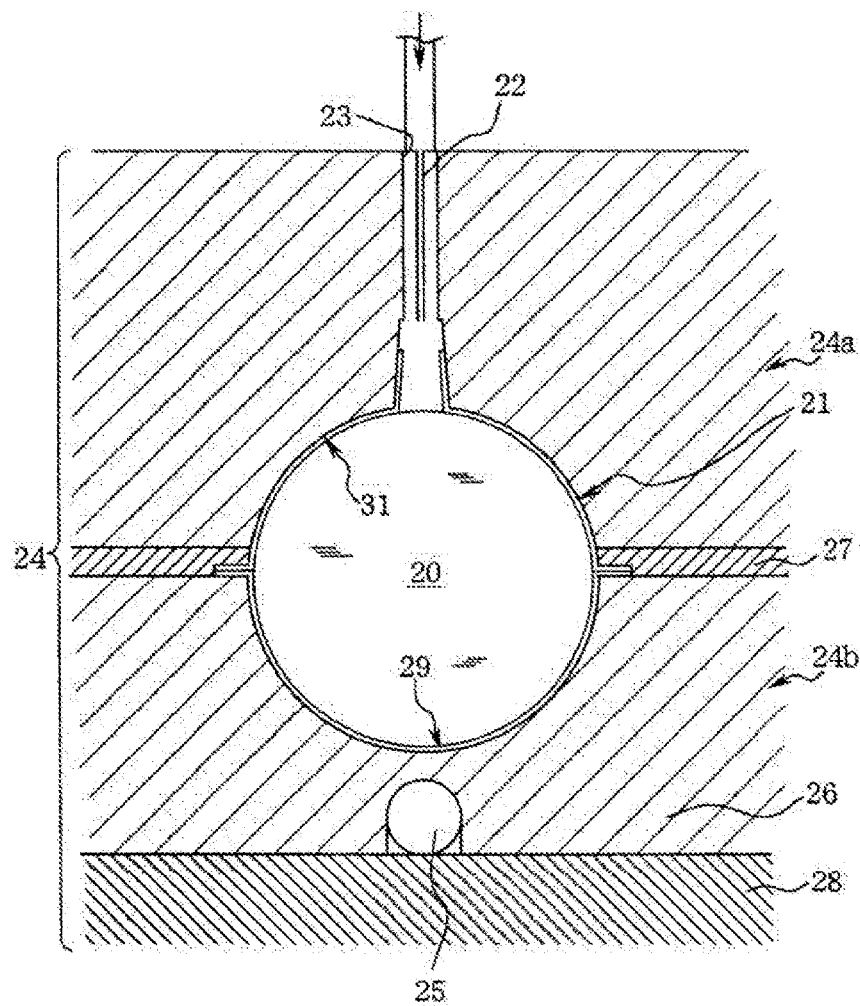
FIGS. 1 and 2 show a diagram representative of the manufacturing equipment of the prior art.
Figure 2:
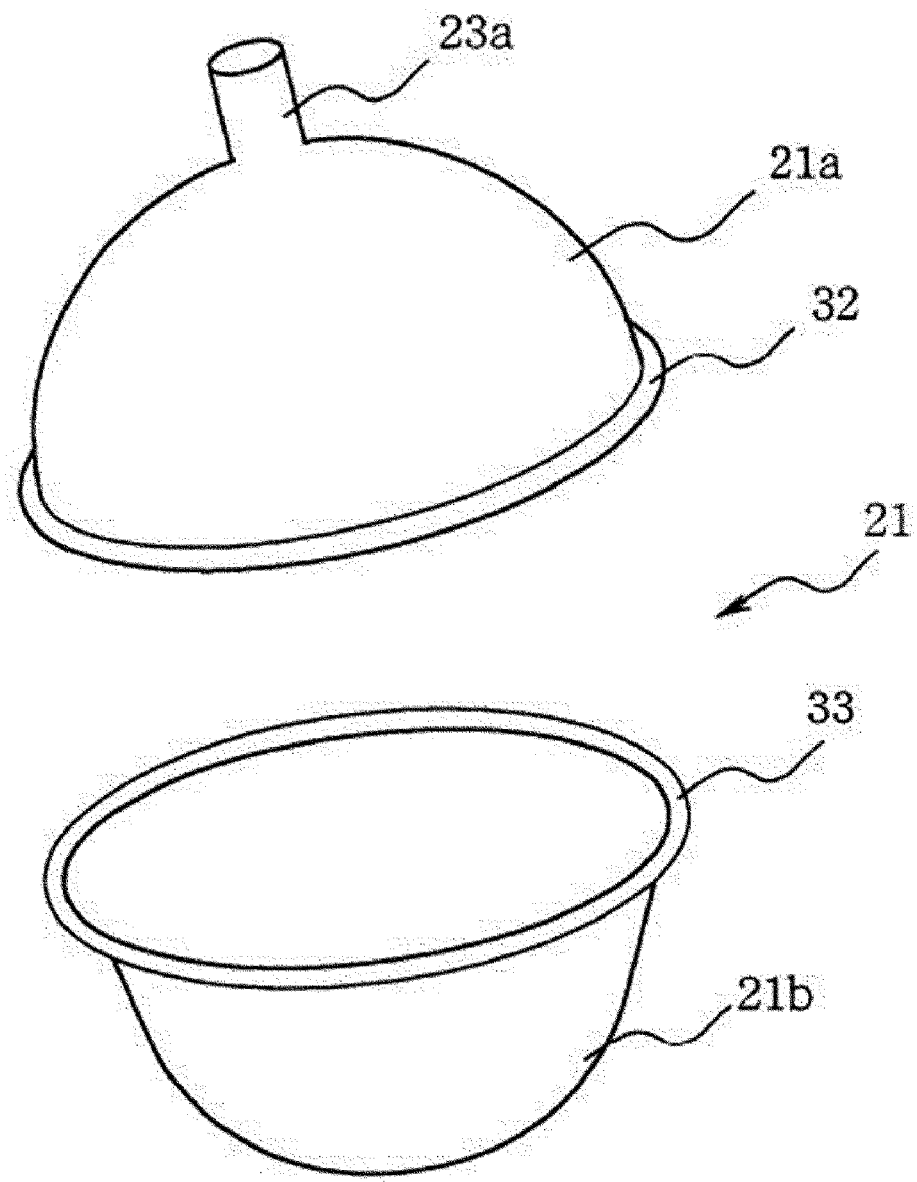
Figure 3:
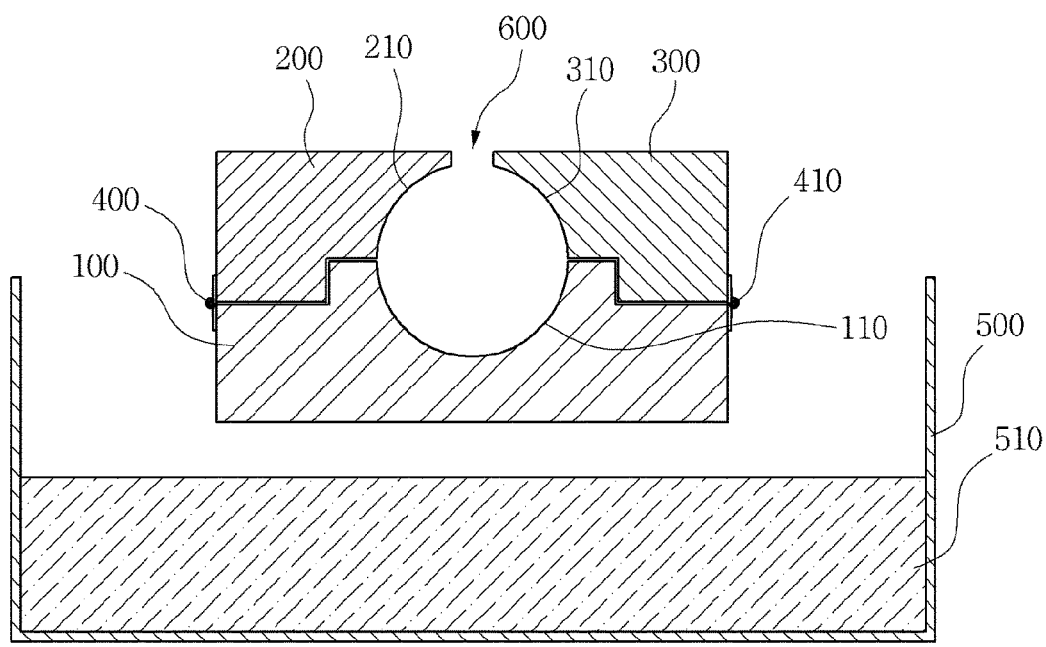
FIG. 3 shows a cross-sectional diagram representative of a spherical frozen food manufacturing device according to the present invention.
Figure 4:
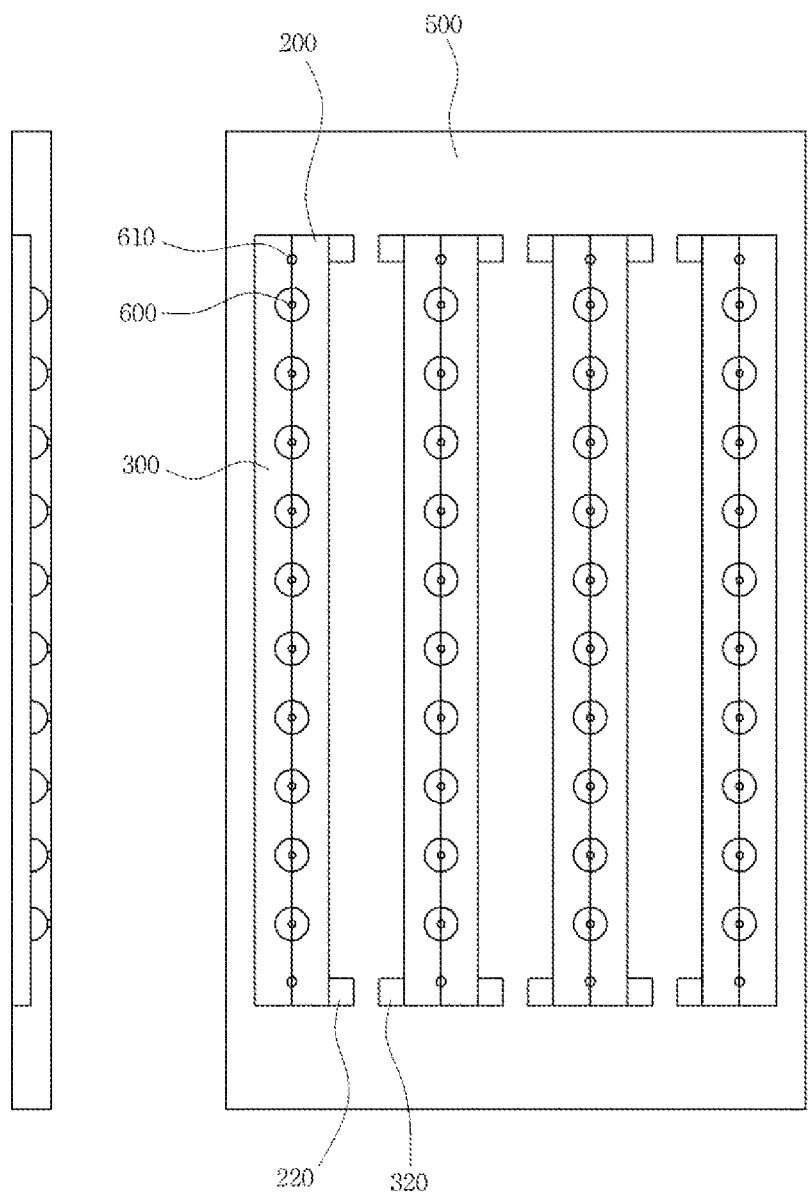
FIG. 4 is a plan view of a series of spherical frozen food devices according to the present invention.

Referring to FIGS. 3 and 4, according to the invention, the spherical frozen food equipment may include in one embodiment a fixed plate (100), a second shaped plate (200), and a third shaped plate (300).

The fixed plate (100) is located on the bottom of the mold. The middle part forms the first shaped plate (110), which has a hemispherical shape. The diameter of hemispherical shape may be about 2.2 cm. The fixed plate (100) can be provided with a plurality of first shaped plates (110), varying in size depending on the design. It is desirable that each of the plurality of the first shaped plates (110) are placed at regular intervals. As will become clearer, the configuration of the shaped plates with respect to one another is important to the extraction process for the finished frozen food.

The top part of the fixed plate (100) has second (200) and third (300) shaped plates. In the second (200) and third (300) shaped plates, there are provided the second (210) and third (310) mold portions to form ¼ of a spherical mold. Thus, the fixed plate (100), and the second (200) and third (300) shaped plates collectively form the shape of the frozen food. Furthermore, an inlet (600) will be provided for injecting the main material into the top of the second (200) and third (300) shaped plates. The raw material may be injected into the inlet via a nozzle. Therefore, the raw material is injected through the inlet (600), and is spherically frozen by the first (100), second (200) and third (300) plates.

The fixed plate (100) may be in communication with a storage unit (500) of the liquid nitrogen. In the storage unit (500), liquid nitrogen (510) will be stored to be used for cryogenically freezing the materials. Thus, through the inlet, the injected material is rapidly frozen by the liquid nitrogen (510) that is located in the lower portion of the fixed plate (100).

At the moment of freezing, it will be desirable that the temperature of the fixed plate (100) is −60° C. to −80° C., and the temperatures of the second and third shaped plates is −40° C. to −60° C.

Figure 5:
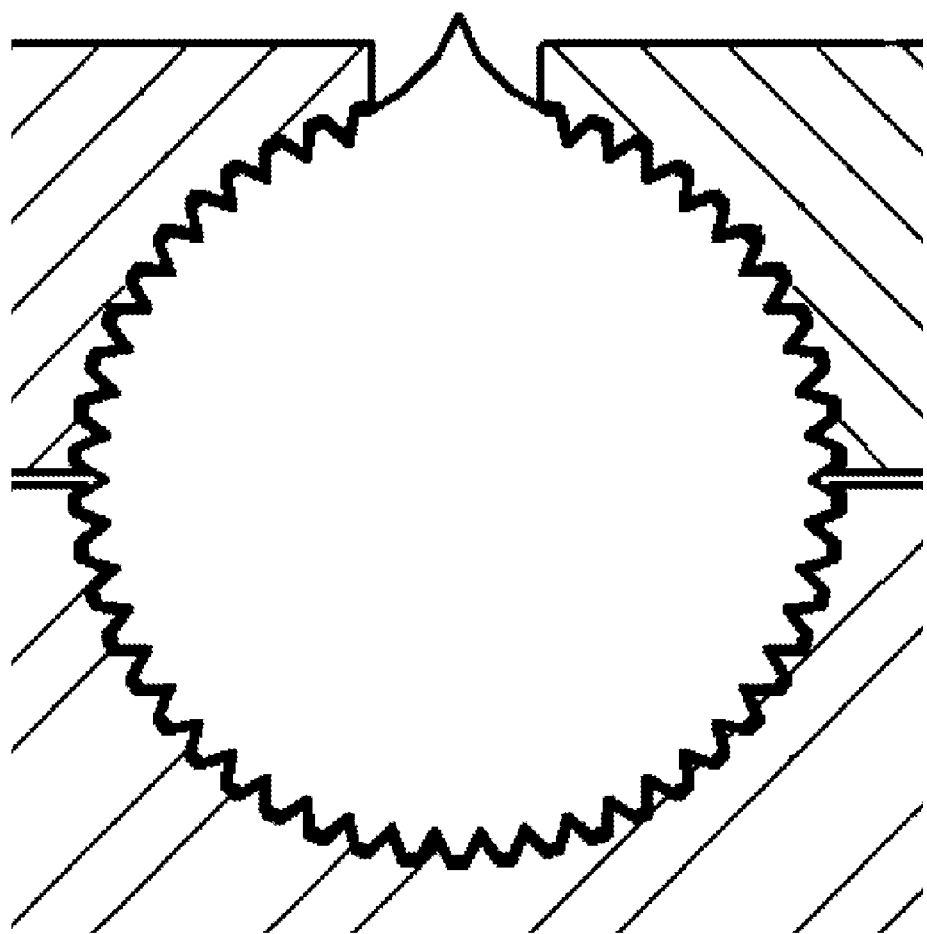
FIGS. 5 and 6 show cross-sectional views of the spherical frozen food devices with varying interior surface patterns.
Figure 6:
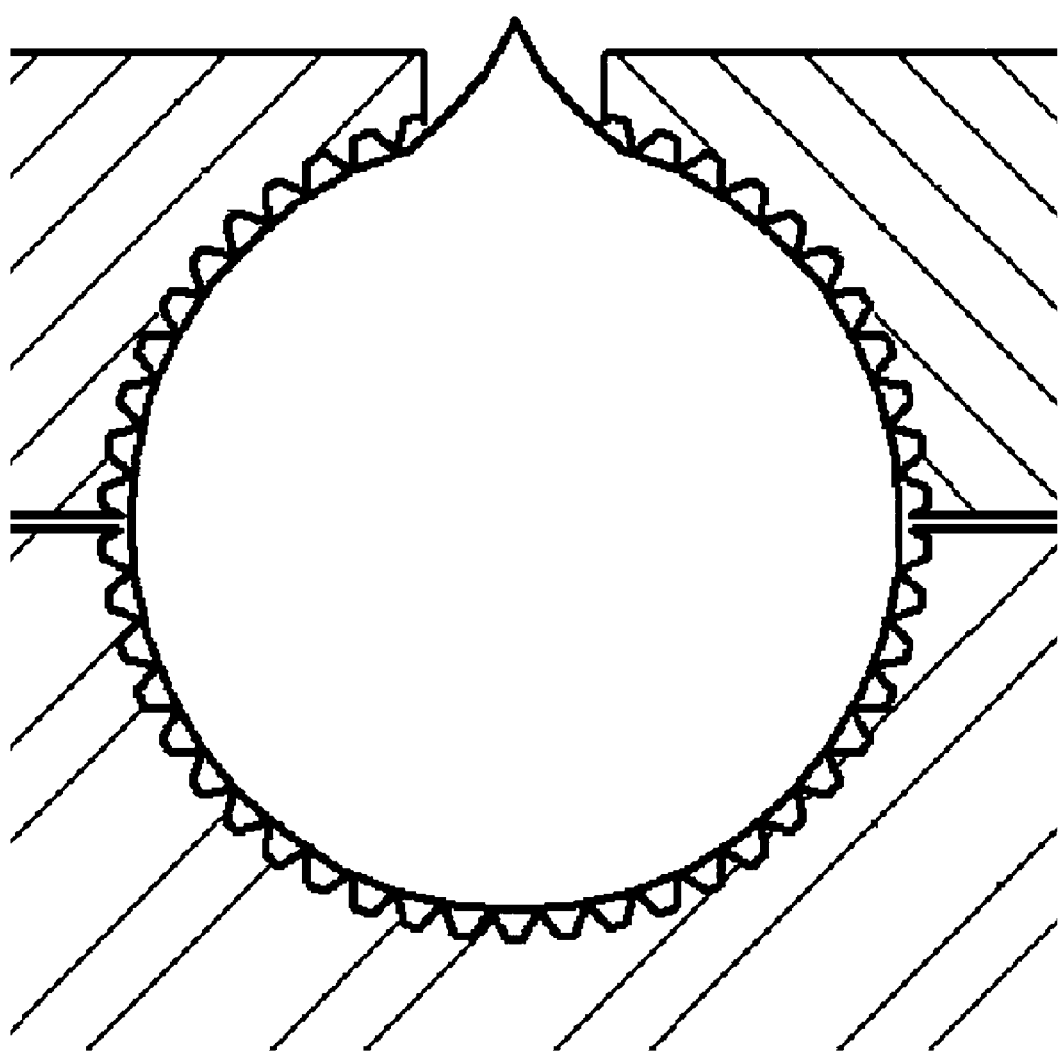

Referring to FIG. 5, the fixed plate (100) may have a roughness on a surface thereof. Also, a bumping and a furrow may be formed. When the material is injected and frozen to form ice-cream, the ice-cream will be formed into bumping and furrow along the surface of the fixed plate (100). After the manufacturing of the ice-cream, it may be difficult to separate the ice-cream from the fixed plate.

Thus, a heating element may be equipped inside of the fixed plate to apply heat to separate the ice-cream from the surface of the fixed plate.

However, if the mixture is injected through an inlet and frozen using liquid nitrogen, a smooth surface can be maintained when the material is frozen.

Therefore, after the spherical ice cream is manufactured, it can be easily separated from the fixed plate without requiring special heating.

On the other hand, the second (200) and third (300) shaped plates are form a mold by way of a releasable mechanism, such as a hinge rotatable about the fixed plate (100). Also, it is included the torsion spring in the way or rotating (400).

Referring to FIG. 4, opening projections (220,320) are formed in the sides of the second and third shaped plates. Also, an opening pin may be provided in the top of the opening projections. When the opening pin is falling down and pushing the opening projections, the second and third shaped plates will be rotating outwardly with respect to the fixed plate.

When the second and third shaped plates are opened, the upper part of the completed frozen food is exposed.

When the opening pin (630) is raised again, it will be closed again by the inward rotation of the second and third shaped plates.

Figure 7:
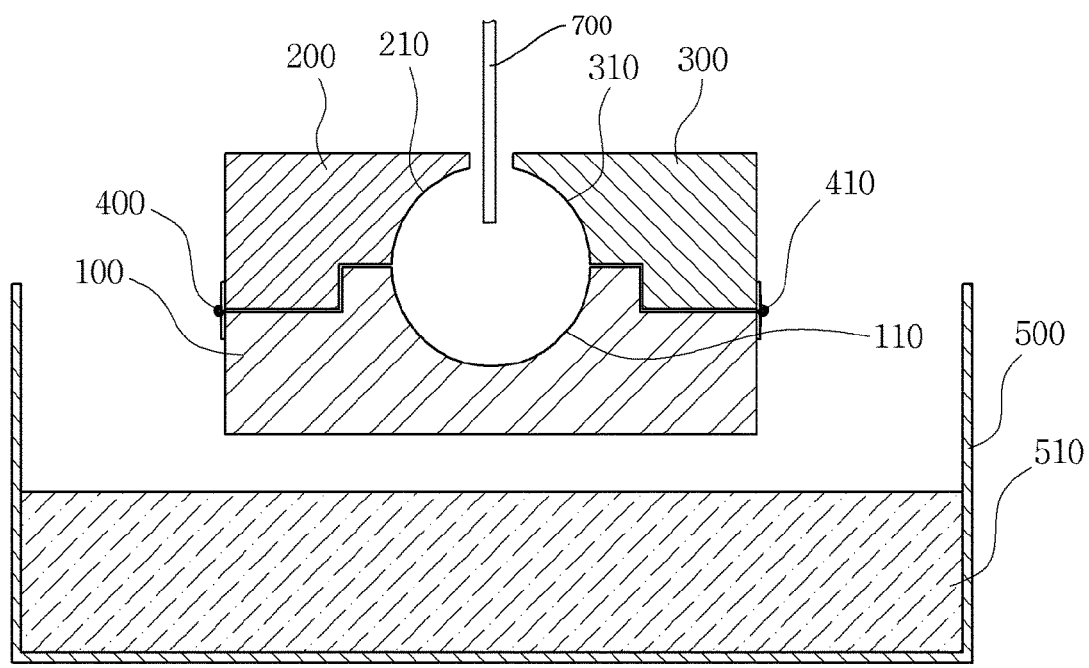
FIG. 7 shows a block diagram of the feed bar of the spherical frozen food manufacturing device according to the present invention.

Referring to FIG. 7, a feed bar (700) may be provided in the upper inlet. The feed bar (700) may cool the material to be inserted into the inlet before injection. The feed bar (700) may be supported externally by a separate structure. It is desirable for the feed bar to have freedom of movement in all directions.

After the materials are frozen, and when the second (200) and third (300) shaped plates are rotated outwardly and opened by the opening pin, the frozen food will be exposed and transported from the equipment by lifting the feed bar (700).

If the feed bar (700) is desired to be removed from the frozen food, the inside of the feed bar may be equipped with a heating element. When heated, the feed bar (700) will melt a portion of the frozen food such that the feed bar may be easily removed.

Figure 8:
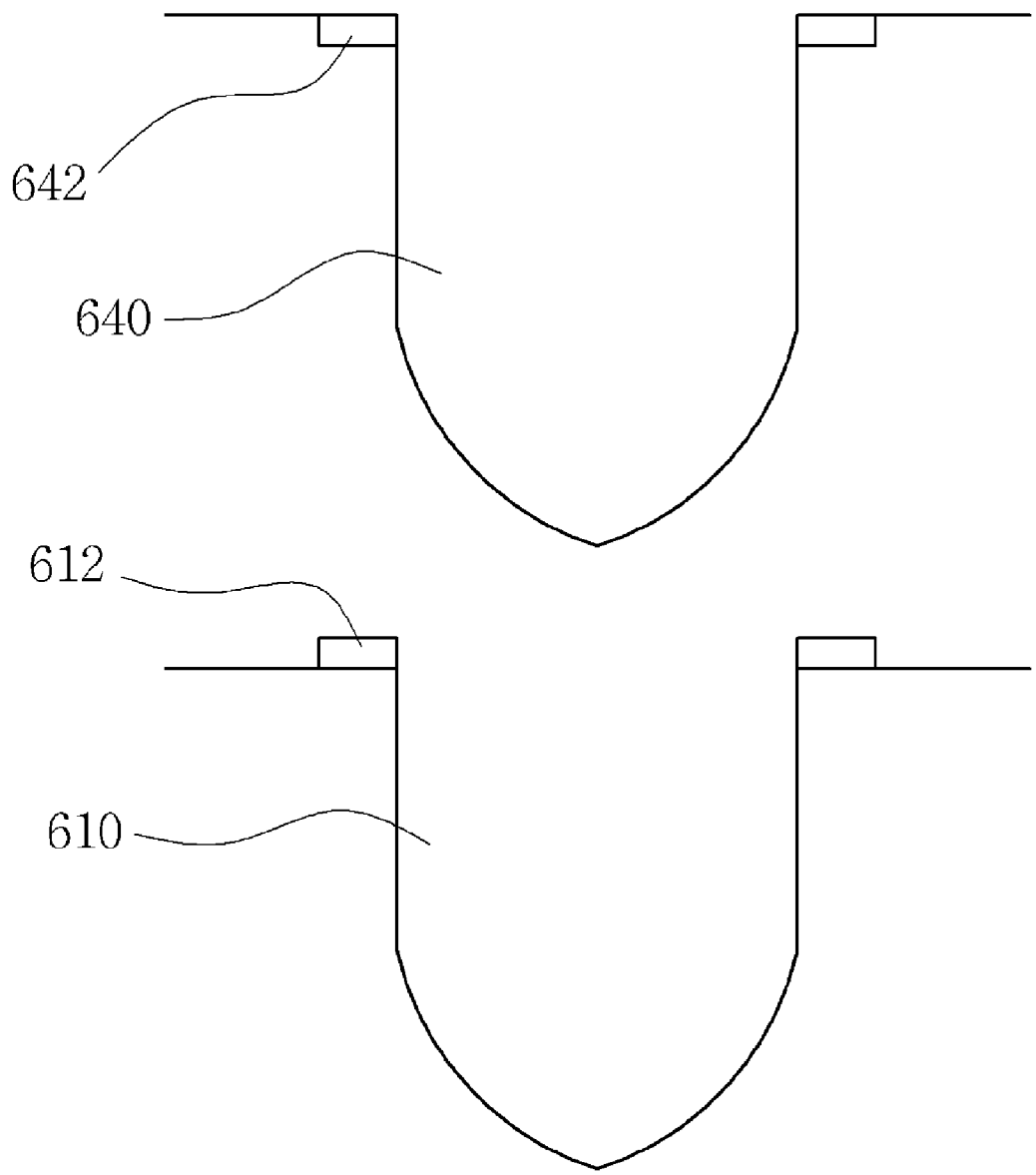
FIG. 8 show a structure map representative of a structure of an alignment pin and an alignment pin home.

On the other hand, referring to FIGS. 4 and 8, an alignment home (610) is formed at the ends of the longitudinal direction of the second and third shaped plates. Also, in the upper part of the alignment home (610), an alignment pin may be provided in a shape corresponding to a shape-based alignment home (610). It may be wider on the part of the alignment home (610) and it may have a smaller cross sectional area at the end of a pointed shape to be going down.

When the molding is transported, the alignment pin (640) is inserted into the alignment home (610). At this time, even if the molding plate was slightly moved towards the correct position, it will be coaxed into the right position by the alignment pin (640). When the alignment pin (640) is fully inserted, it will transmit a signal that the molding plate is placed in the exact position of a control unit using a contact sensor (612,642).

In a further embodiment, a method of manufacturing a spherical ice cream is provided. The mold may be formed of the fixed plate (100), the second shaped plate (200), and the third shaped plate (300). A storage container may be provided near the bottom of the molding plate for storing the liquid nitrogen.

When the molding plate reaches a certain temperature, the ice cream mix may be inserted using the inlet (600). At that time, through the nozzle of the ice cream mix, it is desirable to preset the equipment for potent injection.

The ice cream mix that is injected into the mold is rapidly frozen to form a spherical ice cream bar using the liquid nitrogen. After that, when the opening pin is inserted into the opening projection, the second and third molding plates are opened, and the spherical ice cream is exposed to outside. The spherical ice cream, due to the nature of its shape, is easily separated from the fixed plate.

Next, the opening pin (630) is deviated from the open projections thereby causing the second and third molding plates to close. Repeating the same process, it is possible to expeditiously manufacture a spherical ice cream bar that is larger than a rectangular ice cream bar.

The spherical ice cream is separated from the mold, and may be covered through a coating process using a coating composition, such as, for example, chocolate.

According to the present invention, a heating process is not necessary for separating the spherical ice cream from the plate. Thus, the molding plate may maintain a constant temperature, thereby resulting a faster production time than rectangularly-shaped ice cream bar producers of the prior art.

Figure 9:
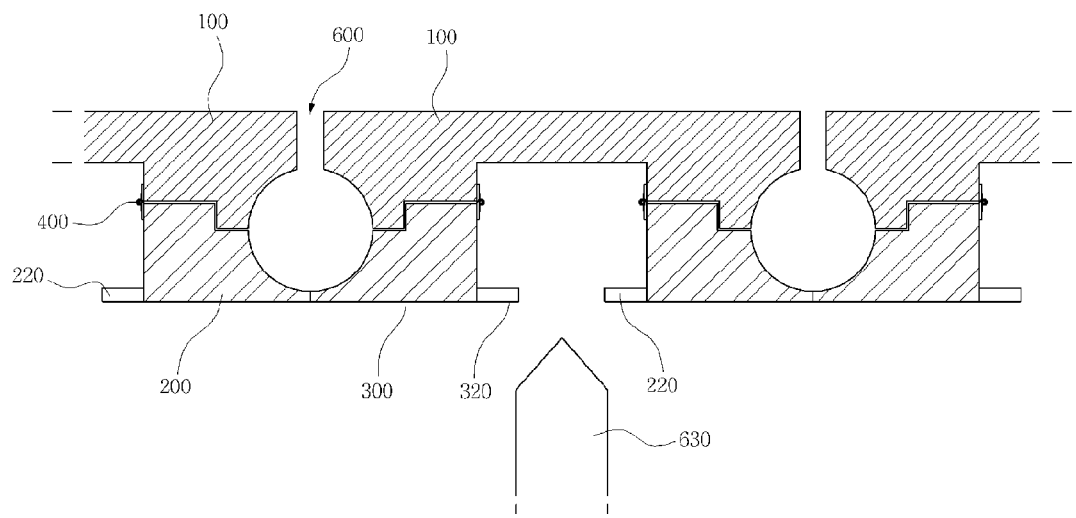
FIGS. 9 and 10 show examples of varying configurations of the spherical frozen food manufacturing devices according to embodiments of the present invention.
Figure 10:
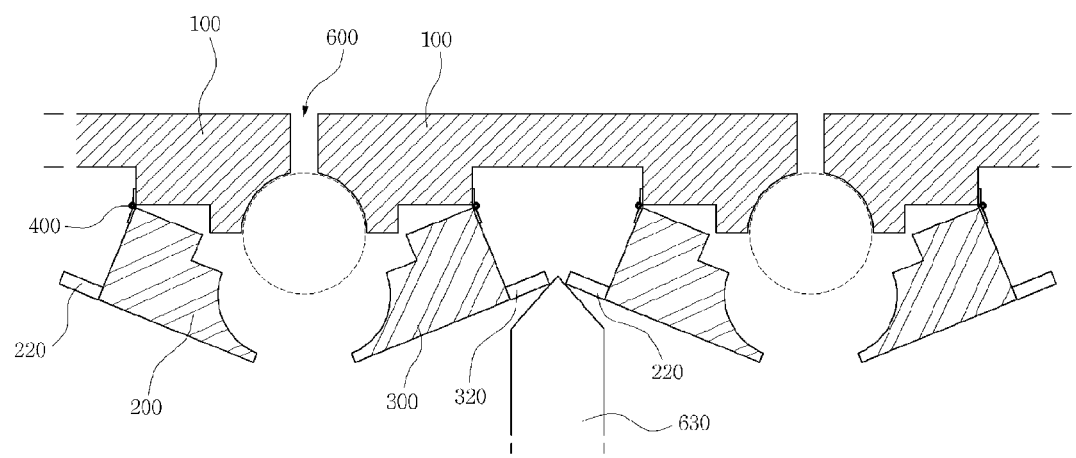

Referring to FIGS. 9 and 10, another embodiment of the disclosed technology will be described. In this embodiment, the fixed plate (100) is located in the upper portion, and the second (200) and third (300) molding plates are placed in the lower portion.

An inlet (600) may be formed in the fixed plate(100), through which materials, such as ice cream mix, may be inserted. The inlet (600) may have a diameter of 8 mm. The second (200) and third (300) molding plates will be opened and/or closed by way of a rotating mechanism, such as, a hinge.

An opening projection (220,320) may be formed in each end of the second (200) and third (300) molding plates. Upon opening the second (200) and third (300) molding plates, the opening pin (630) may extend outwardly. And then the second (200) and third (300) molding plates can be opened to expose the bottom of the ice cream.

After that, when the inlet (600) is gently pushed by the bars, the ice cream will be released down.

Although it is described with reference to an embodiment of the present invention, it should be understand that various changes and modifications may be made to the invention as understood by a person having ordinary skill in the field of technology.

DESCRIPTION OF THE CODE

100: a fixed plate
200: The second shape plate
300: The third shape plate
400: A way of rotating
500: A storage unit of liquid nitrogen
600: An inlet
610: An alignment home
630: A opening pin
700: A feed bar

We claim:

1. A method for spherically freezing materials comprising:
providing a spherical mold, said mold being formed of a first fixed plate, a second shaped plate, and a third shaped plate, said second shaped plate and said third shaped plate being hingedly attached to said first fixed plate;
injecting material into said mold via an inlet disposed in said mold;
subjecting said mold to a freezing temperature causing said material to freeze;
pushing, with an opening pin, on an end of each of said second and third shaped plates, said pushing causing rotation of said second shaped plate and said third shaped plate about a hinged axis such that said frozen material is removable from said mold; and
inserting a feed bar into said material before said material is frozen,
wherein said inlet is disposed in said first fixed plate and wherein said feed bar is used to remove said frozen material from said mold.

2. The method of claim 1, wherein said feed bar comprises a heating element for assisting in removal of said frozen material from said feed bar.

3. A method for spherically freezing materials comprising:
providing a spherical mold, said mold being formed of a first fixed plate, a second shaped plate, and a third shaped plate, said second shaped plate and said third shaped plate being hingedly attached to said first fixed plate;
injecting material into said mold via an inlet disposed in said mold;
subjecting said mold to a freezing temperature causing said material to freeze; and
pushing, with an opening pin, on an end of each of said second and third shaped plates, said pushing causing rotation of said second shaped plate and said third shaped plate about a hinged axis such that said frozen material is removable from said mold;
wherein said first fixed plate is cooled to a temperature in the range of $-60°$ C.$\sim-80°$ C., and said second shaped plate and said third shaped plate are cooled to a temperature in the range of $-40°$ C.$\sim-60°$ C.

4. The method of claim 3, wherein liquid nitrogen is used to freeze said material.

5. A method for spherically freezing materials comprising:
providing a spherical mold, said mold being formed of a first fixed plate, a second shaped plate, and a third shaped plate, said second shaped plate and said third shaped plate being hingedly attached to said first fixed plate;
injecting material into said mold via an inlet disposed in said mold;
subjecting said mold to a freezing temperature causing said material to freeze; and
pushing, with an opening pin, on an end of each of said second and third shaped plates, said pushing causing rotation of said second shaped plate and said third shaped plate about a hinged axis such that said frozen material is removable from said mold;
wherein said step of freezing said material further comprises dipping said mold into a storage container filled with liquid nitrogen.

6. The method of claim 3, wherein said inlet is formed between said second shaped plate and said third shaped plate.

7. The method of claim 5, wherein said inlet is diposed in said first fixed plate.

8. The method of claim 7, wherein a torsion spring causes said second shaped plate and said third shaped plate to recede to a closed position for receiving new material.

* * * * *